United States Patent [19]

Onanhian

[11] Patent Number: 4,812,029
[45] Date of Patent: Mar. 14, 1989

[54] MICROSCOPE SYSTEM

[76] Inventor: Richard A. Onanhian, 85 Irving St., Arlington, Mass. 02174

[21] Appl. No.: 16,580

[22] Filed: Feb. 19, 1987

[51] Int. Cl.⁴ .......................................... G02B 21/00
[52] U.S. Cl. .................................... 350/523; 350/507; 350/528; 350/534
[58] Field of Search ................ 350/507, 521, 523–536, 350/518–519, 238–241, 631; 356/244

[56] References Cited

U.S. PATENT DOCUMENTS

| | | | |
|---|---|---|---|
| 230,688 | 8/1880 | Bausch | 350/238 |
| 328,277 | 10/1885 | Bausch | 350/528 |
| 1,137,444 | 4/1915 | Adams | 350/252 |
| 2,157,157 | 5/1939 | Anketell | 350/507 |
| 2,713,807 | 7/1955 | Herbert | 350/238 |
| 2,971,080 | 2/1961 | Boughton | 350/523 |
| 3,830,560 | 8/1974 | Onanian | 350/528 |
| 4,568,148 | 2/1986 | Onanian | 350/250 |
| 4,606,616 | 8/1986 | Parker | 350/526 |
| 4,682,890 | 7/1987 | de Macario | 356/244 |

FOREIGN PATENT DOCUMENTS

| | | | |
|---|---|---|---|
| 21752 | 2/1979 | Japan | 350/529 |
| 19018 | of 1904 | United Kingdom | 350/521 |
| 612780 | 11/1948 | United Kingdom | 350/531 |

*Primary Examiner*—John K. Corbin
*Assistant Examiner*—Martin Lerner
*Attorney, Agent, or Firm*—Joseph S. Iandiorio; Brian M. Dingman

[57] ABSTRACT

A microscope system which includes an eyepiece section and a base having an integral stage section for holding a specimen to be viewed. The eyepiece section holds a lens and further includes integral bearing elements for movably engaging a complementary guide in the base. A stage hole in the stage section is aligned with the lens and a specimen is held in registration with the stage hole. An adjustment mechanism is provided to finely adjust the position of the eyepiece relative to the base to adjust the focus of the lens. Light is gathered and directed to the specimen by an angularly adjustable mirror or an optical wave guide.

16 Claims, 6 Drawing Sheets

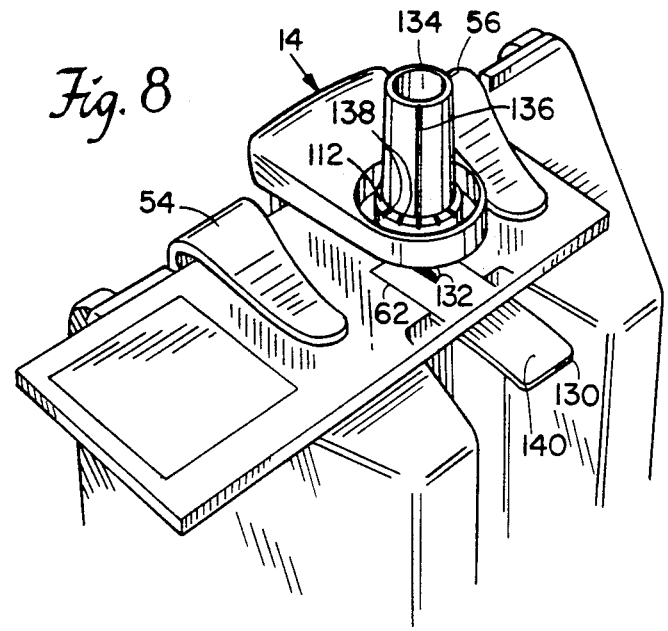
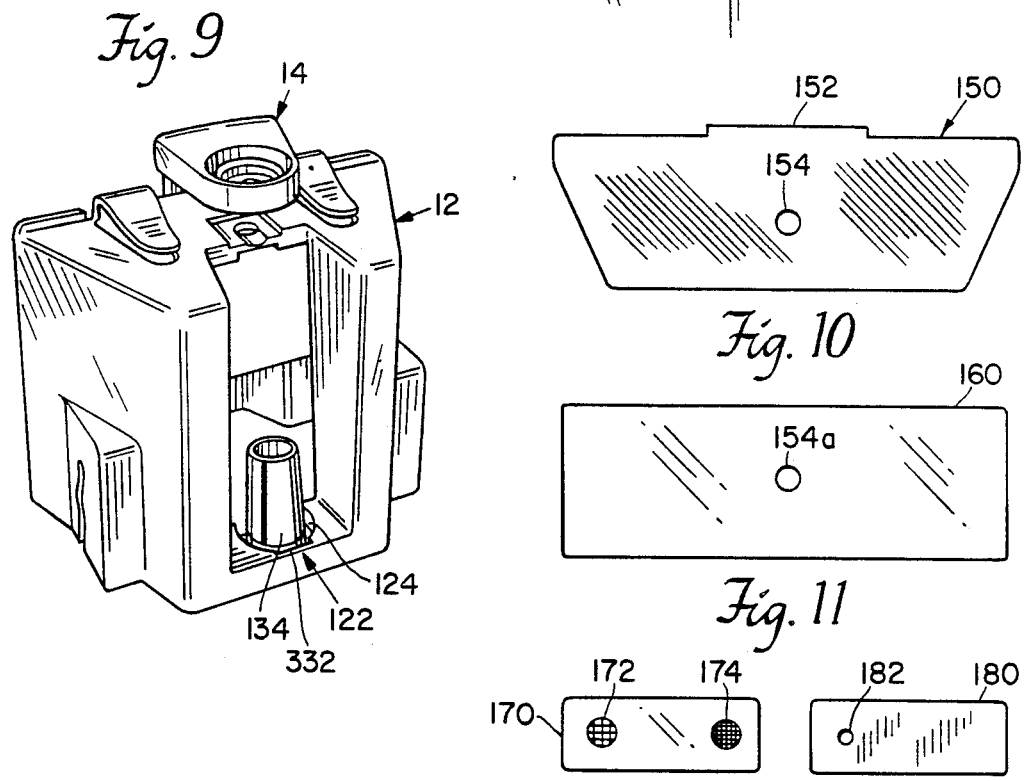
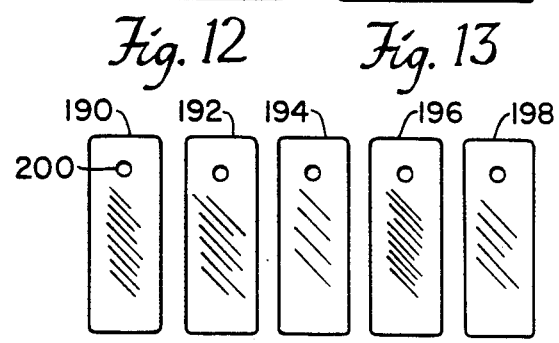
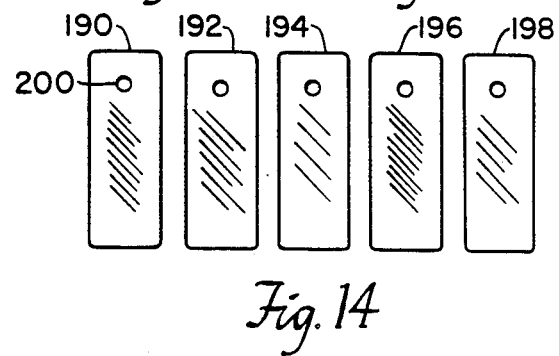

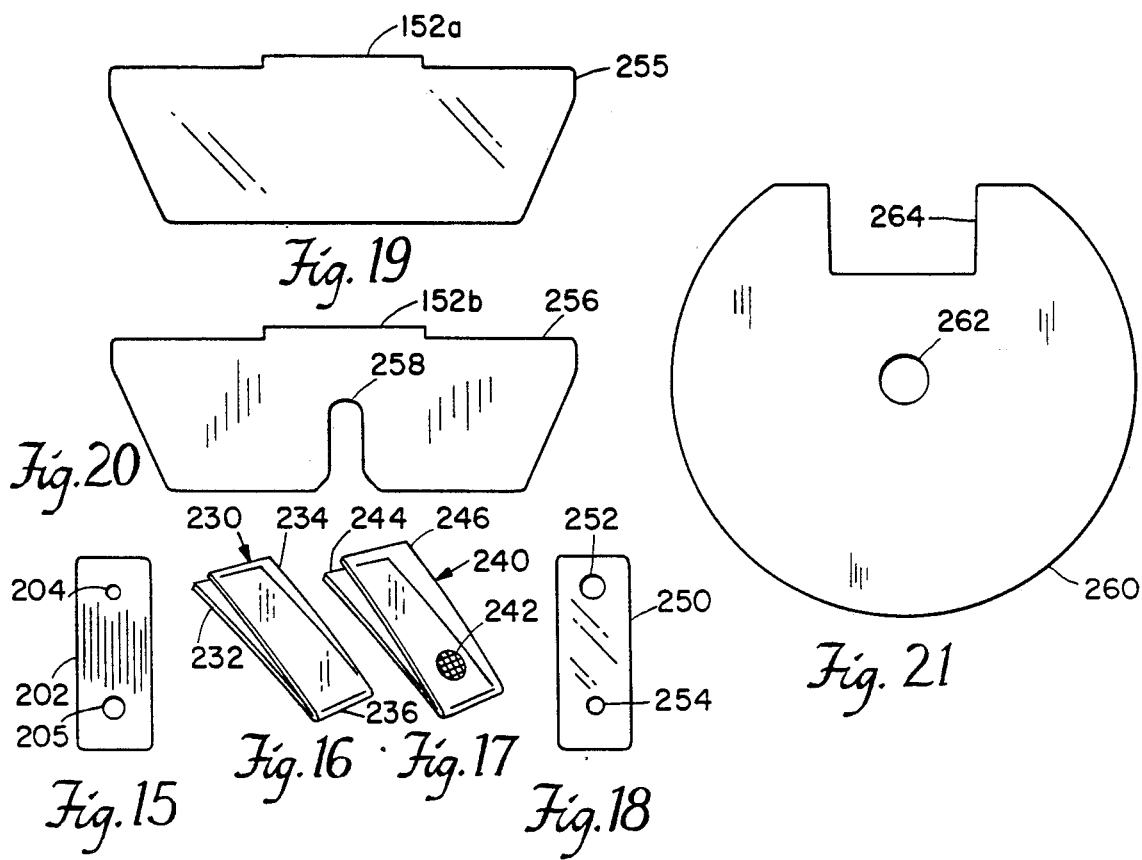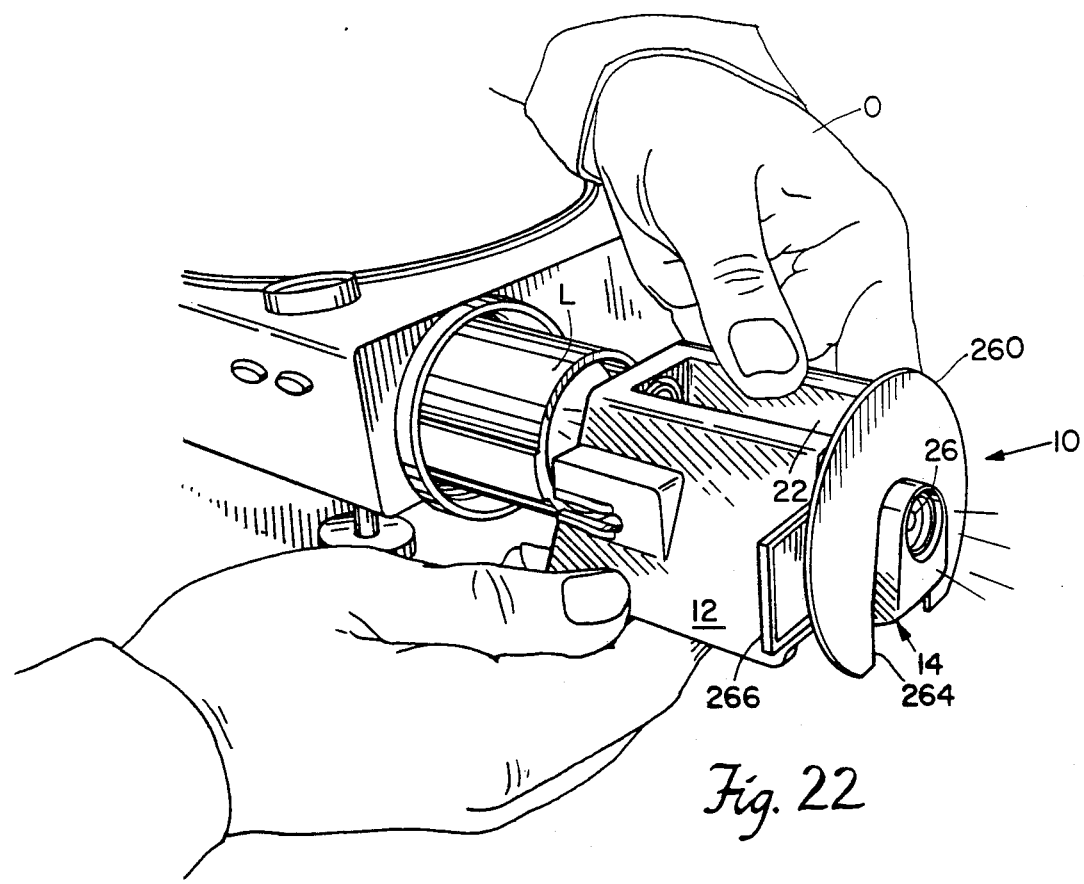

MICROSCOPE SYSTEM

FIELD OF INVENTION

This invention relates to a microscope system and in particular to a relatively inexpensively and simply produced microscope having a wide selection of components and accessories for various functional uses and especially suited for use in recreational and educational applications.

BACKGROUND OF INVENTION

Microscopes designed primarily for toy or hobby uses or for educating novice users such as school children should be relatively low cost, durable and easy to operate. However, many current microscopes built to meet these criteria are limited in function and possess relatively poor optics. Moreover, they are often unduly complex and expensive to manufacture. For example, certain microscopes of this type require multiple molds. Most also employ an eyepiece, stage and base which are separate and distinct elements and which must be interconnected by additional pieces and parts. Such construction is complicated and time-consuming and, as a result, the manufacturing cost and price of the microscope are increased considerably.

Many of the presently available elementary microscopes are also relatively difficult to operate satisfactorily. For example, achieving proper lighting of the specimen being viewed may pose several problems. Attaching a light source to the microscope adds to the complexity of the device and further necessitates a power source, e.g., an electrical outlet or batteries. Alternatively, an angularly adjustable mirror has been employed to reflect external sunlight, artificial lighting or ambient light to the specimen. However, proper positioning of the mirror is quite tedious and difficult to obtain and is easily disrupted particularly during use by school children or other novices. Fine adjustment of the eyepiece and stage sections to permit proper focussing is also often unsatisfactory. For example, there may be looseness or "play" between these pieces which complicates focussing. And, again, the proper focus tends to be easily disturbed, especially by an inexperienced or youthful operator such as a school child.

SUMMARY OF INVENTION

It is therefore an object of this invention to provide an improved inexpensive microscope system which may be constructed quickly and simply and which is both compact and rugged.

It is a further object of this invention to provide such a microscope system which may be simply and effectively operated even by inexperienced users.

It is a further object of this invention to provide a microscope system which permits the operator to quickly, easily and effectively achieve and maintain proper lighting of a specimen and easily regain such lighting if it is disturbed.

It is a further object of this invention to provide a microscope system which exhibits reduced "play" between the eyepiece and base and provides for improved effective fine adjustability of the eyepiece so that proper focussing may be rapidly achieved and maintained.

It is a further object of this invention to provide a microscope system which is capable of high quality resolution.

It is a further object of this invention to provide a microscope system which can collect light from available ambient, natural or artificial sources and transmit it to the objective lens eliminating the need for a mirror.

It is a further object of this invention to provide a microscope system which effectively uses both conventional micro slides and a wide variety of additional features such as a polarizing unit, an optical waveguide, a microprojection unit, reticles, liquid specimen slides, encapsulators, variable apertures, color filters, diffusers and highlighters, all relatively inexpensively.

It is a further object of this invention to provide a microscope system which permits liquid specimens to be viewed without smearing.

It is a further object of this invention to provide a microscope system which provides for compact integral storage of slides, lenses and other optical elements.

This invention features a microscope system which includes a base having an integral stage section for holding a specimen to be viewed and further having integral guide means. There is an eyepiece section for holding a lens and including integral bearing means for movably engaging the guide means. The lens is disposed on the eyepiece section and a stage hole disposed in the stage section is aligned with the lens. Means are integrally formed in the stage section for holding a specimen in registration with the stage hole and means are also provided for finely adjusting the position of the eyepiece section relative to the base to adjust the focus of the lens.

In a preferred embodiment, the means for holding includes a pair of spaced-apart resilient retaining members which extend laterally across the stage section for holding a specimen slide over the stage hole. The means for holding may further include a channel extending laterally across the stage section, the stage hole being disposed in the bottom of the channel for holding a slide tab over the stage hole in a slot formed by channel and slide or plate inserted under the retaining members.

The base may include an inner cavity having access to an external source of light. The base also typically includes at least three projections on the bottom thereof for evenly supporting the base on a table or like surface.

Means may be mounted to the base within the cavity for gathering light and directing the gathered light through the stage hole to the specimen being viewed. The means for gathering and directing may include light reflecting means such as a mirror and angularly adjustable means for mounting the mirror to the base. The means for mounting may include means for releasably gripping the mirror. The angularly adjustable means typically extend through the base and include at least one adjusting knob outside of the base for adjusting the angle of the mirror. The base may include a pair of opposing slots extending from the bottom of the base for receiving the means for mounting. A pair of knobs may be provided at the respective ends of the means for mounting and resilient locking means may be attached to the base adjacent to the slots. Such resilient locking means are engageable with the knob means for snugly locking the means for mounting resiliently in the slots and are retractable for permitting removal of the means for mounting from and introduction of the means for mounting into the slots. More specifically, the resilient locking means may be include a pair of resilient convex sections, each located adjacent to the edges of a respective slot. The convex portions are biased into an extended condition in which the distance between the respective apexes of the convex portions is greater than the distance between the knob means to restrict passage of the knob means past the convex portions. Each convex portion includes a first tapered section for engaging a respective knob means above the apex to urge the means for mounting into a snug fit in the slots and an opposing tapered section for engaging the knob means below the apex to urge the means for mounting toward the entrance of the slots. The sections of the base containing the convex portions are resiliently retractable to permit the means for mounting to be introduced into and removed from the slots past the apexes. The knob means may carry indicia for indicating the angular position of the mirror.

Preferably the base includes at least one external pocket for storing one or more slides and tabs. The eyepiece section may include means for receiving an auxiliary eyepiece and that auxiliary eyepiece may be a compound lens device. The base may include a cavity and a recess disposed in the cavity for storing at least one auxiliary eyepiece.

The means for finely adjusting preferably includes a screw-type adjustment which is manually rotatable. The screw-type adjustment may include a screw permanently attached to the eyepiece section and slideably received by the base and an adjusting wheel which threadably engages the screw and is contiguous to the base. The means for finely adjusting may further include resilient means for biasing the screw into the base to assist lowering of the eyepiece section relative to the base. The base may include integral spring means for bearing against the eyepiece section and urging the bearing means against the guide means. The bearing means and the guide means may include complementary beveled surfaces.

A groove may extend from the stage hole laterally across the stage section when used with a microscope slide or other such plate to create the slot for enabling specimen tabs and slides bearing a liquid specimen to be introduced to and removed from above the stage hole without smearing liquid specimen on the stage section.

A specimen tab may be provided for holding a specimen to be viewed. The specimen tab may include transparent sheets hingably connected along one edge. A reticled tab having a measured grid for indicating the dimensions of the specimen being viewed may also be provided. This device may utilize a slide which includes an opening for suspending liquid specimens therein. A slide may be provided which includes along one edge thereof a projection which fits between the retaining members and restricts longitudinal movement of the slide. A diffuser tab may be utilized to diffuse light illuminating spectrum through the stage hole. The diffuser tab typically includes a hole for highlighting a smaller area of the specimen than illuminated through the stage hole. An aperture tab may be utilized which has at least one hole for reducing the optical aperture of the stage hole. One or more color filtering tabs may be provided for illuminating the specimen with light of respective predetermined colors. The color filtering tab may include an aperture for highlighting a portion of the specimen with contrasting white light.

The auxiliary eyepiece may include a polarizing eyepiece attached rotatably to the eyepiece section to permit adjustment of the polarizing axis of the eyepiece. A polarizing tab for polarizing light illuminating a specimen through the stage hole may also be provided. The polarized tab may include an aperture for contrasting a polarized and non-polarized specimen. The polarizing eyepiece and eyepiece section typically include complementary indicia for indicating the relative position of the polarizing axis of the eyepiece.

The microscope may also utilize a mask having means for mounting the mask to the lens section between the stage section and the lens and an opening which is slightly larger than the lens for limiting light from passing outside of the lens. Such a mask enables the microscope to perform microprojection.

This invention also features a microscope system having a base with an integral stage section, an eyepiece section, means for finely adjusting the position of the eyepiece section and relative to the base, and optical wave guide means for gathering light and directing the light to a stage hole in the stage section. The optical wave guide means typically include means for collecting light and a light pipe interconnected between the means for collecting and the stage hole for transmitting the collected light to the specimen being viewed.

BRIEF DESCRIPTION OF DRAWINGS

Other objects, features and advantages will occur from the following description of a preferred embodiment and the accompanying drawings, in which:

FIG. 8 is an axonometric view of the microscope with a polarizing eyepiece and tab mounted thereto;

FIG. 9 is an axonometric view of the microscope with the polarizing eyepiece of FIG. 8 mounted in the base recess;

FIG. 10 is a top view of a specimen-centering slide according to this invention;

FIG. 11 is a top view of a liquid specimen slide used with the microscope;

FIG. 12 is a top view of a reticled tab according to this invention;

FIG. 13 is a top view of a diffuser/spotlighting tab;

FIG. 14 is a top view of a color filtering tab;

FIG. 15 is a top view of an aperture reduction tab;

FIG. 16 is a top view of a preferred accessory plate;

FIG. 17 is a top view of an alternative accessory plate;

FIG. 18 is an axonometric view of a hinged specimen tab according to this invention;

FIG. 19 is an axonometric view of a hinged tab with a reticle;

FIG. 20 is a top view of a liquid specimen tab;

FIG. 21 is a top view of a mask for use on the microscope in microprojection applications;

FIG. 22 is an axonometric view of the microscope being utilized for microprojection;

DETAILED DESCRIPTION OF THE INVENTION

Figure 1A:
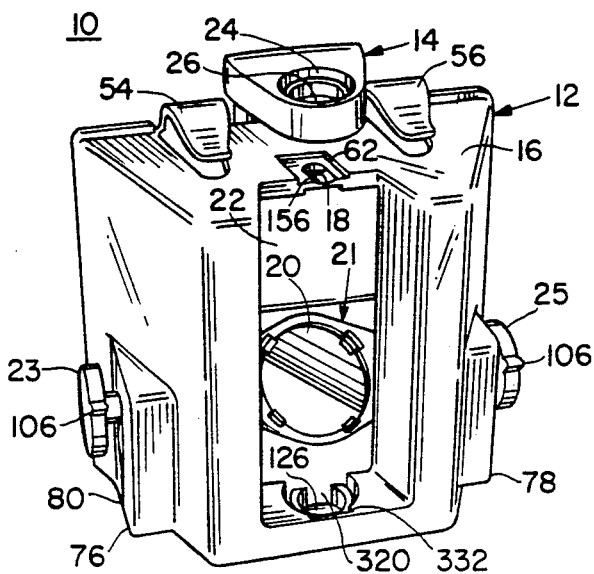
FIG. 1A is an axonometric front view of a preferred microscope system according to this invention.
Figure 1B:
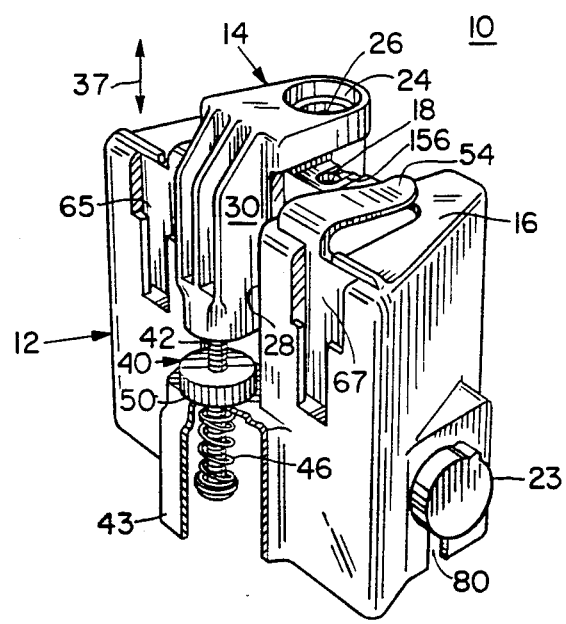
FIG. 1B is an axonometric rear view of the microscope of FIG. 1A.
Figure 2:
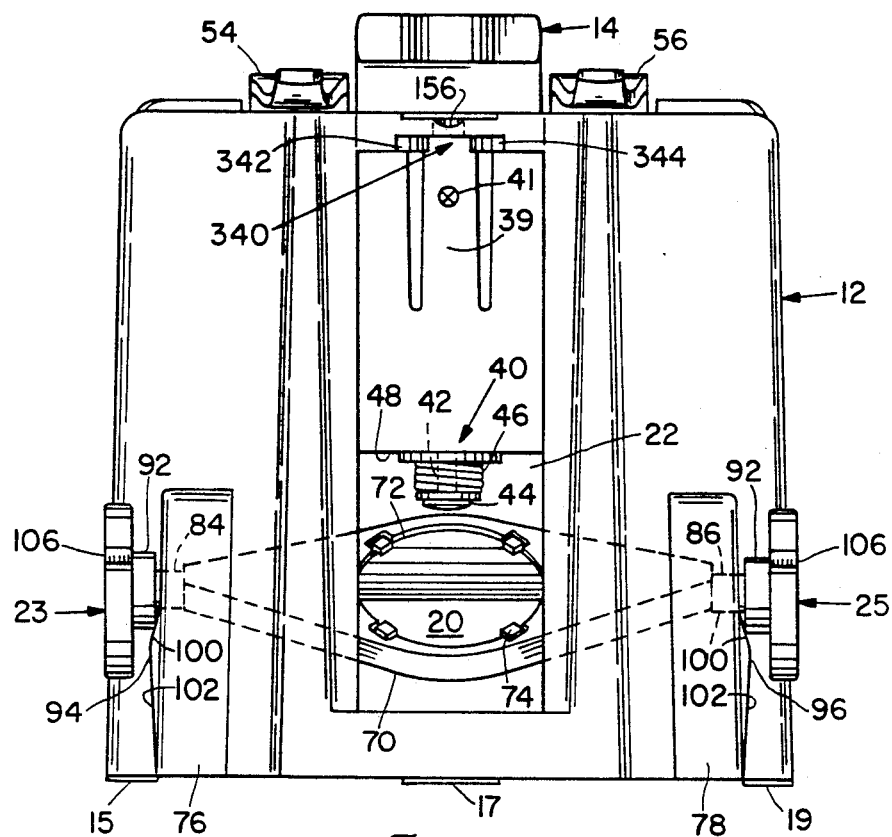
FIG. 2 is an elevational rear view of the microscope.

There is shown in FIGS. 1A and 1B a microscope 10 according to this invention including a base 12 and an eyepiece section 14. Base 12 is typically molded or otherwise formed from a lightweight but durable material such as plastic. The top of the base includes an integral stage section 16 on which lenses, tabs and other optical elements are mounted as described more fully below. Stage section 16 includes a stage hole 18 through which light passes for illuminating the object being viewed. This light is directed to stage hole 18 by a mirror 20 which as shown most clearly in FIG. 2 is mounted by an assembly 21 within a central cavity 22 in base 12. The position of assembly 21 and therefore mirror 20 may be angularly adjusted by knobs 23 and 25 in a manner described more fully below. As shown in FIG. 2, three projections 15, 17 and 19 are provided along the bottom edge of base 12 to provide microscope system 10 with a level foundation so that undesirable tipping and rocking of the device and viewing disruptions are reduced.

Lens section 14 is also composed of a lightweight material such as plastic and includes an opening 24 in which is mounted a lens 26. The lens is aligned with stage hole 18 so that the operator looking through lens 26 may view objects positioned above the stage hole.

Figure 3:
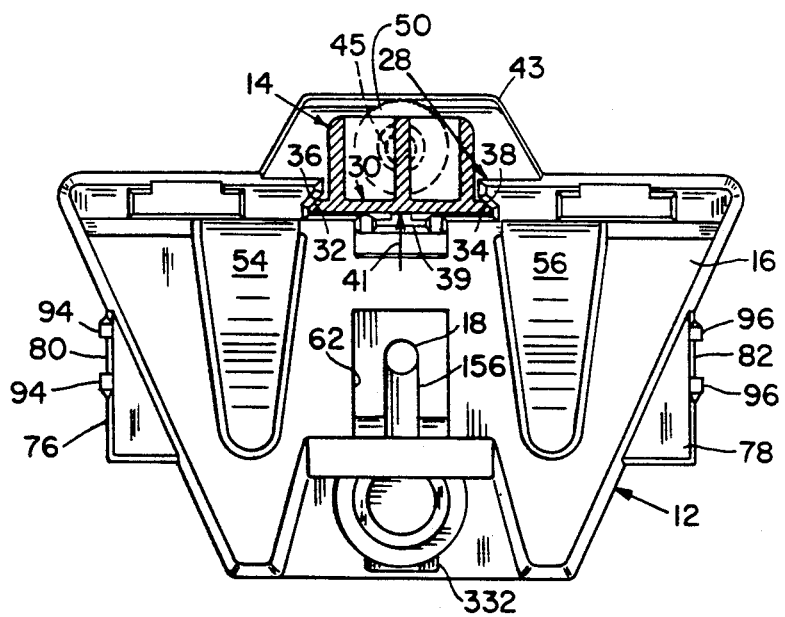
FIG. 3 is a top view of the base and the bearing portion of the eyepiece section with the remainder of the eyepiece cut away for clarity.

As illustrated in FIGS. 1B and 3, base 12 includes a vertical guide 28 in its rearward surface. Eyepiece section 14 includes a bearing portion 30 which is received within guide 28. In particular, bearing portion 30 includes beveled surfaces 32 and 34 which engage complementary beveled surfaces 36 and 38 of guide means 28. As shown in FIGS. 2 and 3, base 12 includes a spring portion 39 formed integrally in the rear surface of the base and biased outwardly in the direction of arrow 41 to bear against bearing portion 30 of eyepiece section 14 and urge beveled surfaces 32 and 34 against the beveled surfaces 36 and 38 of base guide 28. The guide is longer than bearing surfaces 32 and 34 so that eyepiece section 14 is able to slide up and down in the direction of double headed arrow 37 relative to base 12. This enables the operator to properly focus lens 26 on the object being viewed.

Fine adjustment of eyepiece section 14 relative to base 12 is provided by a screw-type adjustment unit 40, FIGS. 1B and 3. This adjustment includes a screw 42 which is threaded to the bottom of eyepiece section 14 and slideably received by base 12 through hole 45 in the upper surface of base projection 43. As seen most clearly in FIG. 2, the lower end of screw 42 extends into base cavity 22 and includes a head 44. A helical compression spring 46 wound about screw 42 extends between head 44 and the inside upper surface 48 of projection 43. This compression spring urges screw 42 downwardly so that eyepiece 14 is always resiliently movable in a biased condition resulting in zero backlash.

Fine adjustment 40 also includes an adjusting wheel 50 which threadably engages screw 42 and is mounted above the top surface of projection 43. Fine adjustment 40 is operated to selectively raise and lower eyepiece section by engaging adjusting wheel 50 with the thumb and turning the wheel in the desired direction, e.g., clockwise to raise and counterclockwise to lower eyepiece section 14. Because the bearing portion 30 of eyepiece section 14 is urged into snug engagement with guide 28 by base spring 39, the relative movement of the eyepiece within the base is firm and precise. Looseness or play between the parts is reduced and fine adjustability is improved. Spring 46, FIG. 2, further contributes to the firm precise feel of adjustment means 40 by assisting the lowering of eyepiece 14 and resisting the raising of the eyepiece because it is under constant bias.

Figure 5:
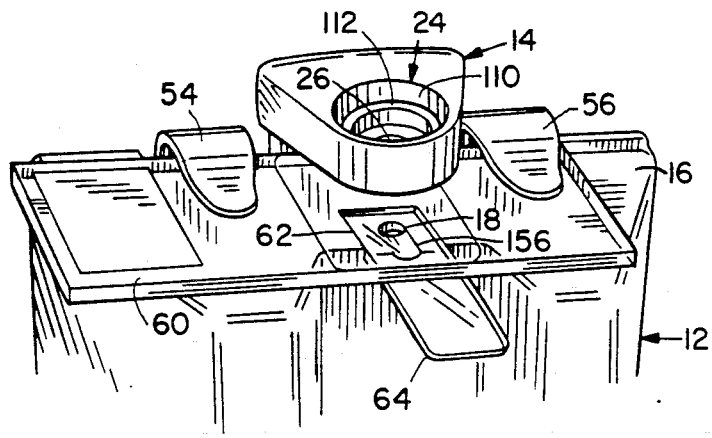
FIG. 5 is a partial axonometric view of the stage section with a tab and specimen slide mounted thereon.

A pair of resilient stage clips 54, 56 are formed integrally with stage section 16 which is in turn formed integrally with the base. These retaining members extend laterally across stage section 16 and, as shown in FIG. 5, serve to hold a specimen slide 60 on stage section 16 above stage hole 18.

Stage section 16 further includes a channel 62 which extends laterally across the stage section. Stage hole 18 is disposed through the bottom of channel 62. The channel is provided for holding one of a variety of complementarily shaped slide tabs 64 in the manner shown in FIG. 5 so that the slide tab is held in registration with stage hole 18 when it is used in conjunction with a conventional sized microscope slide or other securing means. Examples of particular slide tabs which may be employed with this invention and their particular uses are described more fully below. As shown in FIG. 1B, a pair of external pockets 65, 67 may be formed integrally in the rearward face of base 12 for accommodating specimen tabs 64 and any other tabs as required.

Figure 4:
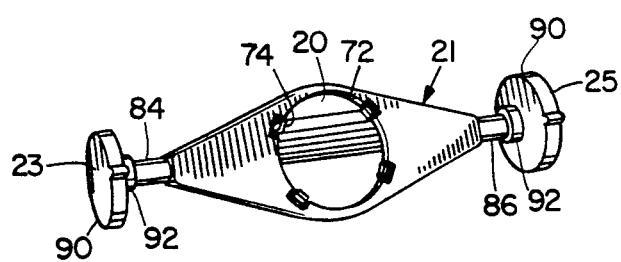
FIG. 4 is an axonometric view of an angularly adjustable mirror assembly used in the microscope of FIGS. 1A-3.

Light from a source external to microscope 10 is received by mirror 20 within cavity 22 and reflected upwardly through the stage hole and the specimen being viewed, including any slides and tabs being utilized, to lens 26. Adjustable mirror assembly 21, shown alone in FIG. 4 includes a central circular recess 72 around which are disposed a plurality of resilient fingers 74, FIGS. 2 and 4. These fingers are biased to hold mirror 20 within recess 72 but they may be retracted to introduce the mirror into or remove the mirror from assembly 21. The adjustable mounting mechanism is itself mounted to base 12 in the manner shown most clearly in FIG. 2. Base 12 includes a pair of wedge-shaped projections 76 and 78 which extend from opposite sides of the base. As shown in FIGS. 1A, 1B and 3, each wedge-like projection includes a generally vertical slot 80, 82 that extends upwardly from the bottom edge of the base. Slots 80 and 82 are aligned so that they receive respective necks 84 and 86, FIGS. 2 and 4, of assembly 21. Knobs 23 and 25 are attached at the ends of necks 84 and 86 respectively and each knob includes an outer large diameter portion 90 and an inner reduced diameter bearing portion 92.

Mounting assembly 21 is held snugly in place within slots 80 and 82 by a resilient locking means formed integrally in base 12 and including a pair of resilient convex portions 94, 96, FIGS. 2 and 3. Each convex section is located adjacent to the edges of a respective slot 80, 82 and is biased into an extended condition in which the distance between the apexes of the respective convex sections is greater than the distance between the inner surfaces of respective bearing portions 92 of knobs 23 and 25. Each convex section includes a first tapered surface 100 which extends between the inner end of the slot and the apex and a second reversed tapered portion 102 which extends between the apex and the entrance of the slot. To mount mounting assembly 21 and its mirror 20 within base 12 the necks 84 and 86 of the mounting assembly are aligned with respective slots 80 and 82 and assembly 21 is urged into the slots. Bearing portions 92 of knobs 23 and 25 slide along tapered surfaces 102 of convex portions 94 and 96 respectively and the convex portions are gradually squeeze inwardly because of the resiliency provided by the base design until knobs 23 and 25 pass over the apexes of the convex portions. Bearing portions 92 then slide over reverse tapered surfaces 100 of the respective convex portions. The convex portions of the base again expand outwardly but never to their original position and, as a result, bearing portions 92 and the entire mounting assembly 21 are urged toward, and are constantly biased against, the tops of slots 80 and 82. The mirror mounting assembly is thereby held in a constantly tensioned grip so that it may be precisely angularly rotated with a minimum of "play". The snug fit also prevents the mirror from becoming accidentally disrupted during use because it is continuously damped. Proper positioning is further assisted by a pair of ribs 106 which are formed in the large diameter outer portions 90 of knobs 23 and 25 and which indicate the angular orientation of the mirror by finger sensing. This eliminates the need for the user to disrupt operation by removing his eyes from the eyepiece to see the actual mirror position.

Opening 24 of eyepiece section 14, FIG. 5, includes an annular recess 110 which surrounds an annular mounting ring 112 that in turn holds lens 26. Recess 110 is provided for accommodating an auxiliary lens such as compound lens 114, FIG. 6. The upper end of lens 114 includes an ocular piece 116 which is attached to reduced diameter tube 118. The reduced diameter tube is slidably received within a large diameter tube 120 so that the focus of compound lens 114 may be adjusted in the direction of double-headed arrow 122. The distal end of large diameter tube 120 is received by recess 110 in eyepiece 14 so that the compound lens 114 is held securely in place by friction.

Figure 6:
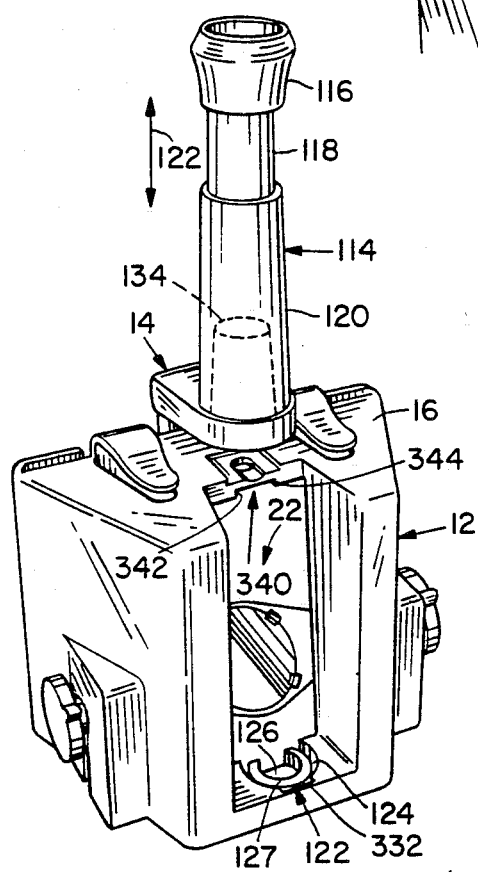
FIG. 6 is a partial axonometric view of the microscope with a compound lens attached to the eyepiece.
Figure 7:
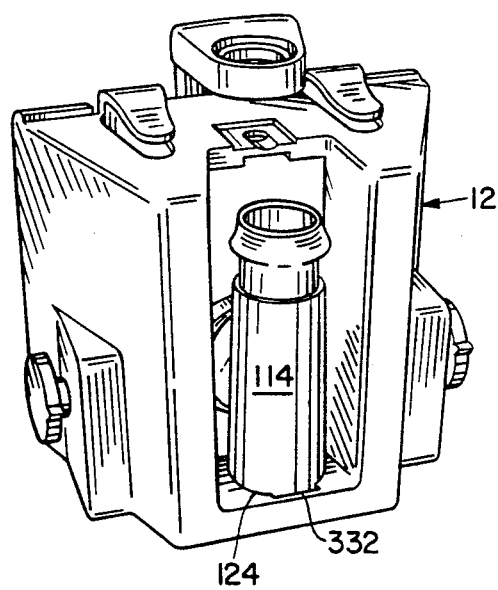
FIG. 7 is an axonometric view of the front of the microscope with a compound lens stored in a recess in the base.

As shown in FIG. 6, as well as in FIGS. 1A and 3, base 12 includes a recess 122 disposed near the bottom of the base proximate the entrance to cavity 22. More specifically, recess 122 includes an outer semi-annular outer recess 124 and an inner recess 126 separated by an arcuate portion 127. As shown in FIG. 7, the lower distal end of large tube 120 of compound eyepiece 114 fits within outer recess 124 so that compound lens attachment 114 may be stored within cavity 122 when not in use.

A polarizing kit which may be employed with microscope 10 and which enables the user to view any specimen under polarized light is shown in FIG. 8. The kit includes a polarizing tab 130 having a longitudinal polarizing axis and a semicircular aperture 132 proximate one end. The aperture 132 may need not be any particular shape so long as it provides a split viewing aperture. This is useful with other tabs as well, e.g. color, reticle. As with all other tabs, the polarizing tab must be used in conjunction with a microscope slide or some other plate inserted under the stage clips containing the specimen to be polarized so that a slot is formed to receive and retain the tab. The kit further includes a polarizing eyepiece 134 having a longitudinal notch 136 formed on the exterior of the eyepiece which indicates the polarizing axis of the eyepiece. The lower end of eyepiece 134 fits snugly within mounting ring 112 of eyepiece section 14. By rotating polarized eyepiece 134 within ring 112, the polarizing axis of the eyepiece relative to that of tab 130 is varied. A series of graduations or markings 138 are provided about ring 112 and by aligning vertical groove 136 on eyepiece 134 with markings 138 the operator can determine the relative angularity between the two polarizing axes. Semicircular aperture 132 permits the operator to view a portion of the specimen with unpolarized light at the same time as the remainder of the specimen is being viewed with polarized light. Totally polarized viewing is provided simply by reversing tab 130, e.g., by removing the apertured end of the tab from channel 62 and inserting the wholly polarized end 140 into the channel. The compound lens shown in FIG. 6 may be utilized in conjunction with the polarizing kit simply by mounting the lens over polarizing eyepiece 134 onto eyepiece section 14 within eyepiece recess 110 as shown in FIG. 6.

When the polarizing kit is no longer in use, eyepiece 134 is removed from eyepiece section 14 and, as shown in FIG. 9, inserted within inner recess 126 of recess 122. The compound lens may be placed completely over polarizing eyepiece 134 and received within outer recess 124 as previously shown in FIG. 7.

A specimen centering slide 150 which may be utilized in microscope 10 is shown in FIG. 10. Slide 150 fits on stage section 16 beneath resilient retaining members 54 and 56 and includes a rearward projection 152 which fits snugly between the two retaining members. As a result, the specimen on slide 150 is automatically centered above stage hole 18. Slide 150 may also include a central hole 154 which receives a liquid specimen to be viewed. A specimen droplet is introduced into hole 154 and held therein by surface tension; slide 150 is then positioned on stage section 16 and slid beneath retaining members 54 and 56 until hole 154 is positioned over the stage hole. As shown in FIGS. 1A and 1B, 3 and 5, a shallow groove 156 extends laterally from stage hole 18 to the front edge of stage section 16. As slide 150 is inserted into and removed from stage section 16, groove 156 accommodates the specimen in hole 154 so that the liquid specimen does not make contact with the stage and is not smeared or otherwise disturbed. A conventional sized microscope slide 160, FIG. 11, may also be provided with a liquid specimen accommodating hole 154a.

The specimen tabs may include one or more optical features. For example, as shown in FIG. 12, tab 170 includes a reticle or grid 172 proximate one end of the tab and a different scaled reticle or grid 174 at the other end. One grid may include, for example, 0.1 inch squares and the other grid may include 0.01 inch squares. However, such dimensions are for illustrative purposes only and are not meant to limit this invention. In order to make viewing and scaling easier certain of the grid lines, for example, every tenth line, may be bold. Tab 170 is inserted within channel 62 as previously illustrated in FIG. 5 so that one of the grids is disposed in the field of view and automatically centered over the stage hole. Typically, the tab is inserted beneath a slide containing specimen to be measured. In order to maintain the specimen and the selected grid on tab 170 in focus, the specimen and grid should be located in essentially the same focal plane. Therefore, at low magnifications, after the specimen slide has been inserted on stage 16, tab 170 should be introduced into channel 62 with the respective grid 172 or 174 faced upwardly against the bottom of tee slide. When higher magnifications are desired, the respective focal planes of the grid and specimen may be narrowed even further by reversing the specimen slide and placing the specimen cover slip directly against tab 170.

Diffuser tab 180, FIG. 13, may be employed to improve the optical quality of the magnified image by providing diffusing light. This can be of assistance where the light directed through the stage hole is poorly distributed, overly bright or where the specimen is very thin. Tab 180 further includes an aperture 182 at one end. When this apertured end is inserted in the stage channel 62, a small portion of brighter undiffused light is provided along with the diffuse light so that a specific portion of the specimen is highlighted by a spotlight.

Various color filtering tabs 190 through 198, FIG. 14, may be utilized to provide the specimen with a tint of any desired color. A small aperture 200 is provided at one end of each such color filtering tab to provide an unfiltered image which contrasts with the tinted image. Tab 202, FIG. 15, is made opaque with small different sized apertures 204 and 205 proximate each end that can be used to reduce, as desired, the aperture provided by stage hole 18.

Although the specimen tabs have been heretofore illustrated as optical elements for providing desired viewing characteristics in connection with the specimen being viewed, such tabs may also be employed to hold the specimen itself. When used to hold specimens, tabs must be employed in combination with an accessory plate, such as 255 or 256, to create the slot necessary to retain the tabs. For example, a hinged specimen tab 230, FIG. 16, is a transparent device formed of two transparent sheets 232 and 234 which are hingably connected at 236 so that a specimen can be placed between them. Alternatively, a hinged grid tab 240, FIG. 17, may include a reticle or grid 242 for determining the dimensions of specimens held between sheets 244 and 246 of tab 240. A liquid specimen tab 250, FIG. 18, includes a pair of apertures 252 and 254 which accommodate variable sizes of droplets of a liquid specimen to be investigated. Here again, groove 156 prevents liquid specimen from making contact with the stage. This tab must be used with accessory plate 256 so that retaining slot 258 avoids a wipe-off of the liquid specimen via the top surface of the tab.

A transparent accessory plate 255, FIG. 19, is mounted on stage 16 beneath retaining members 54 and 56 in a manner similar to the specimen slide shown in FIG. 8. A tab may then be inserted beneath plate 255 into channel 62 as previously described. An alternative accessory plate 256, FIG. 20, may be clear or opaque and includes a lateral slot 258 which combined with groove 156 permits liquid specimen tab 250 to be introduced between plate 256 and stage 16 without smearing. Plates 255 and 256 are provided with centering projections 152a, 152b respectively, which fit between stage clips 54 and 56.

Microscope 10 may be utilized to project an image of a specimen on a screen. To accomplish this, an opaque microprojection mask 260, FIG. 21, is provided. Mask 260 includes a central hole 262 and a rectangular recess 264 in the periphery of the mask. As shown in FIG. 22, to perform microprojection a specimen slide 266 carrying a specimen is mounted as previously described on the stage section of microscope 10. The mirror or alternative light gathering device is removed from cavity 22 of base 12 and microprojection mask 260 is fitted onto eyepiece section 14 by engaging recess 264 with the back of the eyepiece section. As a result, mask 260 is positioned between specimen slide 266 and lens 26 and, in particular, hole 262 is aligned between the obscured stage hole and lens 26. Microscope 10 is held in the horizontal position shown in FIG. 22 by operator O and the bottom open end of base 12 is placed close to projector lens L. As a result, light passes through base 12 of microscope 10 and its stage hole and the illuminated image of the specimen is projected through hole 262 of mask 260 and lens 26 onto a screen or other projecting surface, typically two to five feet away. Hole 262 is slightly larger than the diameter of stage hole 18. As a result, opaque mask 260 blocks all illumination emanating from lens L except that which passes through the stage hole containing lens 26. The illumination striking outside of lens 26 is blocked by the mask and, as a result, a sharp clear image of the specimen is projected. By utilizing a darker room and/or a higher wattage projection lamp, larger and longer projection images can be obtained.

Figure 23:
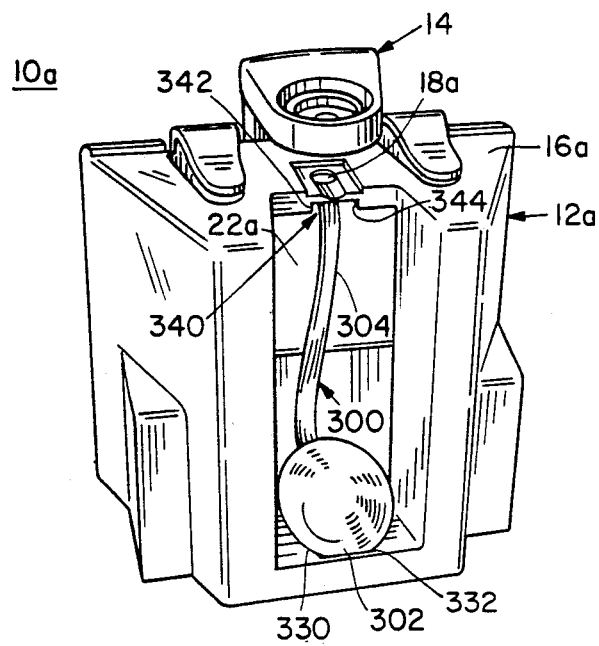
FIG. 23 is an axonometric view of an alternative microscope according to this invention which uses a fiber optic wave guide to direct light to the specimen being viewed.
Figure 24:
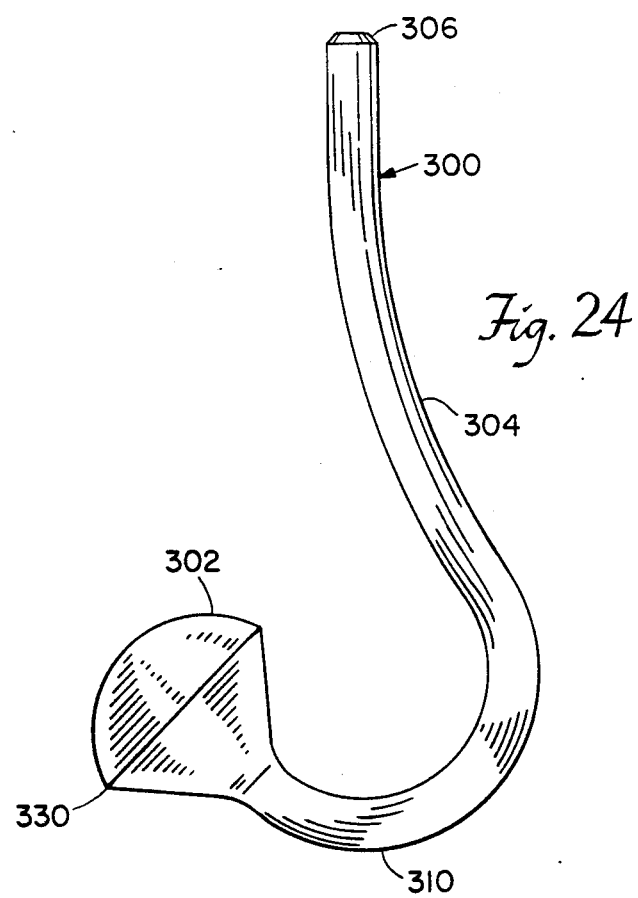
FIG. 24 is an elevational side view of the wave guide of FIG. 23.

In an alternative embodiment, FIG. 23, microscope 10a includes an optical wave guide 300 for collecting external light and transmitting that light through the stage hole for illuminating the specimen of interest. As shown most clearly in FIG. 24, the wave guide includes a rounded collecting lens 302 and a gooseneck curved light pipe 304 extending from lens 302. The distal end of light pipe 304 terminates in a beveled surface 306. As shown in FIG. 23, wave guide 300 fits snugly into cavity 22a within base 12a. In particular, the lower end 310, FIG. 24, of light pipe 304 snap-fits within inner recess 126, FIGS. 1A and 6, in base 12a and extends out over the rearward opening 320 of the recess. The edge 330, FIGS. 23, 24, of wave guide 300 nests snugly in the enlarged front recess 332, FIGS. 1A, 6 and 23. From there, light pipe 304 curves upwardly and tapered upper end 306 is snap-fit into stage hole 18. Beneath stage 16 is guideway 340, FIGS. 2, 6 and 23, which includes tapered sides 342, 344 for gently guiding end 306 of light pipe 304 and self-centering it at stage hole 18. The light pipe is somewhat resiliently flexible so that it may be flexed to introduce wave guide 300 into and remove it from base 12. To focus light on a specimen of interest base 12a is manipulated so that lens 302 faces the general direction of a light source. The light is then collected by lens 302 from a wide admittance angle and delivered through light pipe 304 and stage hole 18a to illuminate the specimen of interest mounted on stage 16a. The exit (distal) end of the light pipe can be given a fine matte finish so that light transmitted to the specimen/lens is always clearly diffused--regardless of the quality of light source.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A microscope system comprising:
    a base including an integral stage section for holding a specimen to be viewed and further including integral guide means and an inner cavity for accessing a source of light;
    an eyepiece section for holding a lens and including integral bearing means for movably engaging said guide means;

a stage hole in said stage section and a lens in said eyepiece section which is aligned with stage hole;

means integrally formed in said stage section for holding a specimen in registration with said stage hole;

means for finely adjusting the position of said eyepiece section relative to said base to adjust the focus of said lens;

means within said cavity, for gathering and directing light through said stage hole to the specimen being viewed;

angularly adjustable means for mounting said means for gathering and directing light to aids base;

said means for mounting including at least one knob means for adjusting the angle of said means for gathering and directing light;

a pair of opposing slots in said base for receiving said means for mounting; and resilient locking means including at least one resilient convex portion biased into an extended condition and being engageable with said knob means for snuggly restraining said means for mounting in said slots and for permitting removal of said means for mounting from said slots.

2. The system of claim 1 in which said resilient locking means includes at least one pair of resilient convex portions, each convex portion including an apex and a first tapered section for engaging a knob means above the apex, to urge said means for mounting into a snug fit in said slots and an opposing tapered section for engaging said knob means below the apex to urge said means for mounting toward the entrance of said slots, said convex portions being resilient to permit said means for mounting to be introduced into and removed from said slots past the apexes.

3. The system of claim 1 in which said integral means for holding includes a pair of spaced apart resilient retaining members which extend laterally across said stage section for holding a specimen slide over said stage hole.

4. The system of claim 1 in which said means for holding includes a channel extending laterally across said stage section, said stage hole disposed in the bottom of said channel, said channel serving to hold a slide tab over said stage hole in conjunction with a microscope slide or other plate acting as a hold down in forming a substage slot.

5. The system of claim 1 in which said means for gathering and directing includes light reflecting means.

6. The system of claim 5 in which said light reflecting means includes a mirror, 7. The system of claim 6 in which said means for mounting includes means for releasably gripping said mirror.

8. The system of claim 2 in which said means for finely adjusting includes a screw-type adjustment which is manually rotatable.

9. The system of claim 8 in which said screw-type adjustment includes a bolt attached to said eyepiece section and slideably received by said base and an adjusting wheel threadably engaging said screw and mounted on said base.

10. The system of claim 9 in which said means for finely adjusting includes resilient means for constantly biasing said screw into said base to assist lowering of said eyepiece section relative to said base.

11. The system of claim 1 in which said base further includes integral spring means for bearing against said eyepiece section and urging said bearing means against said guide means.

12. The system of claim 11 in which said bearing means and said guide means include complementary beveled surfaces.

13. The system of claim 1 further including a groove extending from said stage hole laterally across said stage section of enabling specimen tabs bearing a liquid specimen to be introduced to and removed from above said stage hole without smearing liquid specimen on said stage section.

14. The system of claim 1 in which said knob means carry indicia for indicating the angular position of said mirror.

15. A microscope system comprising:

a base including an integral stage section for holding a specimen to be viewed and further including integral guide means and an inner cavity for accessing as source of light;

an eyepiece section for holding a lens and including integral bearing means or movably engaging said guide means;

a stage hole in said stage section and a lens in said eyepiece section which is aligned with said stage hole;

means integrally formed in said state section for holding as specimen in registration with said stage hole including a pair of spaced apart resilient retaining members which extend laterally across said stage section for holding a specimen over said stage hole and a channel extending laterally across said stage section, said stage hole being disposed in the bottom of said channel, said channel serving to hold at least one slide tab over said stage hole;

means for finely adjusting the position of said eyepiece section relative to said base to adjust the focus of said lens;

means mounted within said cavity for gathering and directing light through said stage hole to the specimen to be viewed;

angularly adjustable means for mounting said means for gathering and directing light to said base;

said means for mounting including at least one knob means for adjusting the angle of said means for gathering light;

a pair of opposing slots in said base for receiving said means for mounting; and resilient locking means including at least one resilient convex portion biased into an extended condition and being engageable with said knob means for snuggly restraining said means for mounting in said slots and for permitting removal of said means for mounting from said slots.

16. A microscope system comprising:

a base including an integral stage section for holding a specimen to be viewed and further including integral guide means and an inner cavity having access to an external source of light;

light reflecting means including a mirror mounted within said cavity for gathering and directing light through a stage hole located in said stage section to the specimen to be viewed;

angularly adjustable means including a pair of knob means for mounting said light reflecting means to said base;

a pair of opposing slots extending from the bottom of said base for receiving said means for mounting;

resilient locking means including at least one pair of resilient convex portions each located adjacent to the edge of a respective slot, and being engageable with said knob means for snuggly restraining said means for mounting in said slots and for permitting removal of said means for mounting from said slots;

said convex portions being biased into an extended condition in which the distance between the respective apexes of said convex portions is greater than the distance between said knob means to restrict passage of said knob means past said convex portions;

each of said convex portions including a first tapered section for engaging a respective knob means above the apex to urge said means for mounting into a snug fit in said slot and an opposing tapered section for engaging said knob means below the apex to urge said means for mounting toward the entrance of said slots, said convex portion being resilient to permit said means for mounting to be introduced into and removed from said slots past the apexes;

an eyepiece section for holding a lens and including an integral bearing means for removably engaging said guide means;

a lens in said eyepiece which is aligned with said stage hole in said stage section;

means integrally formed in said stage section for holding a specimen in registration with said stage hole; and means for finely adjusting the position of said eyepiece section relative to said base to adjust the focus of said lens.

* * * * *